United States Patent
Bucher et al.

(10) Patent No.: US 10,975,734 B2
(45) Date of Patent: Apr. 13, 2021

(54) WASTE HEAT UTILIZATION DEVICE

(71) Applicant: Mahle International GmbH, Stuttgart (DE)

(72) Inventors: Michael Bucher, Berlin (DE); Michael Hoetger, Berlin (DE); Hannes Marlok, Leonberg (DE); Harald Scherg-Kurmes, Berlin (DE); Gerd Wierczorek, Berlin (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/659,160

(22) Filed: Oct. 21, 2019

(65) Prior Publication Data

US 2020/0123933 A1   Apr. 23, 2020

(30) Foreign Application Priority Data

Oct. 22, 2018 (DE) ...................... 10 2018 218 065.2

(51) Int. Cl.
*F01P 9/00* (2006.01)
*F01K 23/06* (2006.01)
(Continued)

(52) U.S. Cl.
CPC .............. *F01K 23/065* (2013.01); *F02G 5/02* (2013.01); *B60H 2001/3297* (2013.01);
(Continued)

(58) Field of Classification Search
CPC ........ F01K 23/10; F02G 5/02; F02G 2260/00; F02G 5/00; F02G 5/04; Y02T 10/166
(Continued)

(56) References Cited

U.S. PATENT DOCUMENTS 9,702,272 B2   7/2017   Ernst et al.
2010/0205950 A1   8/2010   Hoetger et al.
(Continued)

FOREIGN PATENT DOCUMENTS

DE   10 2007 033 611 A1   1/2009
DE   10 2010 055 914 A1   8/2011
(Continued)

OTHER PUBLICATIONS

English abstract for JP-200838916.
(Continued)

*Primary Examiner* — Long T Tran
*Assistant Examiner* — James J Kim
(74) *Attorney, Agent, or Firm* — Fishman Stewart PLLC

(57) ABSTRACT

A method for operating an internal combustion engine having a waste heat utilization device including a waste heat utilization cycle in which a valve mechanism, an evaporator, and an expander are arranged, may include adjusting the valve mechanism between an evaporator position and a bypass position via a control/regulating device as a function of at least one operating parameter of the internal combustion engine. The method may also include calculating at least one of a power and an energy generatable by the waste heat utilization device via the control/regulating device as a function of the at least one operating parameter of the internal combustion engine. The method may further include switching the expander between an active state and an inactive state via the control/regulating device as a function of the at least one of the calculated power and the calculated energy.

20 Claims, 1 Drawing Sheet

(51) Int. Cl.
*F02G 5/02* (2006.01)
*F01N 5/02* (2006.01)
*F01K 23/10* (2006.01)
*B60H 1/32* (2006.01)
*F01K 13/02* (2006.01)

(52) U.S. Cl.
CPC ............ *F01K 13/02* (2013.01); *F01K 23/101* (2013.01); *F01N 5/02* (2013.01); *F01N 2240/02* (2013.01); *F02G 2260/00* (2013.01)

(58) Field of Classification Search
USPC ....................................................... 123/41.01
See application file for complete search history.

(56) References Cited

U.S. PATENT DOCUMENTS

| | | | | |
|---|---|---|---|---|
| 2013/0084164 A1* | 4/2013 | Adachi | .................. | F01K 25/08 415/122.1 |
| 2013/0340452 A1* | 12/2013 | Kleman | ................ | F25B 41/043 62/115 |
| 2015/0176482 A1* | 6/2015 | Haraguchi | .............. | F02D 21/08 60/605.1 |
| 2016/0288784 A1* | 10/2016 | Teraya | .................. | B60W 10/06 |
| 2017/0074122 A1* | 3/2017 | Versteyhe | ............. | F01K 23/065 |
| 2019/0032597 A1* | 1/2019 | Johansson | ............. | B60W 10/30 |
| 2019/0203615 A1* | 7/2019 | Lindenmeier | ............ | F02G 5/02 |
| 2019/0257216 A1* | 8/2019 | Johansson | ............. | F01K 23/065 |

FOREIGN PATENT DOCUMENTS

| | | |
|---|---|---|
| DE | 10 2010 048 918 A1 | 4/2012 |
| DE | 10 2010 055 915 A1 | 6/2012 |
| DE | 102011122099 A1 | 6/2012 |
| DE | 10 2012 204 262 A1 | 9/2013 |
| DE | 10 2012 020 176 A1 | 4/2014 |
| DE | 102013222763 A1 | 5/2015 |
| JP | 200838916 A | 2/2008 |

OTHER PUBLICATIONS

English abstract for DE-102013222763.
English abstract for DE-10 2012 020 176.
English abstract for DE-10 2010 048 918.
English abstract for DE-102010055914.
English abstract for DE-102010055915.
English abstract for DE-10 2012 204 262.

\* cited by examiner

WASTE HEAT UTILIZATION DEVICE

CROSS-REFERENCE TO RELATED APPLICATIONS

This application claims priority to German Patent Application No. DE 10 2018 218 065.2, filed on Oct. 22, 2018, the contents of which are hereby incorporated by reference in its entirety.

TECHNICAL FIELD

The invention relates to a waste heat utilization device, in particular for an internal combustion engine of a motor vehicle.

BACKGROUND

A conventional waste heat utilization device, which preferably operates according to the Rankine cycle process or according to the Rankine-Clausius cycle process, respectively, usually comprises a waste heat utilization cycle, in which a working fluid circulates. In the waste heat utilization cycle, a conveying device for driving the working fluid, an evaporator for evaporating the working fluid, an expansion machine for relaxing the working fluid, and a condenser for condensing the working fluid are arranged one behind the other in the flow direction of the working fluid.

In this context, DE 10 2012 020 176 A1 discloses an internal combustion engine comprising a waste gas system, which has two waste gas ducts. A heat exchanger is arranged in one of the two waste gas ducts. The waste gas can be distributed to the two waste gas ducts by means of a waste gas control device.

DE 10 2007 033 611 A1 deals with an arrangement for the waste gas heat utilization comprising a steam generation device, in which heat contained in the waste gas can be transferred to a working medium for further use. The arrangement comprises a heat storage device, which can be acted upon by the waste gas, and control means for controlling partial waste gas flows through the heat storage device, and the steam generating arrangement in accordance with a value representing the available thermal energy of the waste gas. When more waste gas heat is required than is required for the steam generation, a partial flow of the waste gas ejected from an internal combustion engine is guided into a heat storage device.

DE 10 2010 048 918 B4 discloses a waste gas system comprising two waste gas lines for each cylinder. The waste gas system comprises means for adjusting the waste gas volume flowing through the two waste gas lines.

DE 10 2010 055 914 A1 describes a device for distributing a waste gas flow of an internal combustion engine in a vehicle comprising a waste gas system comprising waste gas line. A waste gas aftertreatment device and/or a heat recovery device are arranged in the waste gas system. A bypass line bypassing the waste gas aftertreatment device and/or a heat recovery device are furthermore arranged in the waste gas system.

DE 10 2010 055 915 A1 deals with a method for distributing a waste gas flow of an internal combustion engine comprising a waste gas system and downstream or integrated waste gas aftertreatment device. At least a portion of the waste gas can be applied to a bypass line, which is arranged so as to bypass the waste gas aftertreatment device.

DE 10 2012 204 262 A1 deals with a heat engine, which comprises a working medium cycle. A waste gas heat exchanger, which can be bypassed by means of a waste gas bypass line, is provided in the working medium cycle.

SUMMARY

It is an object of the present invention to create an improved embodiment for an operating method of an internal combustion engine comprising a waste heat utilization device, which provides for an operation of the internal combustion engine with improved efficiency.

These objects are solved by means of the subject matter of the independent claim(s). Preferred embodiments are the subject matter of the dependent claim(s).

It is thus the basic idea of the invention to vary the amount of the waste gas, which is introduced into the evaporator of the waste heat utilization device as a function of one or a plurality of operating parameters of the internal combustion engine on the one hand, and to optionally turn on or turn off the expansion machine, which his present in the waste heat utilization device, for performing mechanical work on the other hand. The heat contained in the waste gas can be used optimally in this way to generate mechanical energy, if necessary, which, in turn, can be converted into electrical energy with the help of an electrical generator or which can be coupled directly into the drive train of the internal combustion engine as drive power. In the case of the method introduced here, it is essential for the invention that the power or energy, which can be currently provided by the waste heat utilization device, is calculated as a function of said operating parameters, and is considered in response to the control of the expansion machine or of the evaporator, respectively. In this way, the efficiency of the waste heat utilization device is increased as compared to conventional operating methods.

The method according to the invention serves to operate an internal combustion engine comprising a waste heat utilization device. The waste heat utilization device comprises a waste heat utilization cycle, in which a working fluid circulates and in which an evaporator for evaporating the working fluid is arranged. An expansion machine is arranged in the waste heat utilization cycle downstream from the evaporator. Said expansion machine can be switched between an active state, in which it performs mechanical work by relaxing the working fluid, and an inactive state, in which no mechanical work is performed.

The evaporator has a waste gas line for guiding waste gas out of an internal combustion engine, through which, during the operation of the internal combustion engine, waste gas generated by said internal combustion engine is guided to the working fluid fluidically separately. The working fluid in the evaporator for absorbing heat from the waste gas thereby thermally interacts therewith. The waste heat utilization device furthermore comprises a waste gas bypass line, via which the waste gas can be guided out of the internal combustion engine, through the evaporator or past the evaporator, fluidically separately from the waste heat utilization cycle.

The waste heat utilization device according to the invention furthermore comprises a valve device, which can be adjusted between an evaporator position, in which the waste gas is guided through the evaporator and past the waste gas bypass line, and a bypass position, in which the waste gas is guided through the waste gas bypass line and thus past the evaporator. The valve device can thus also be adjusted into intermediate positions, in which the waste gas is partially guided through the waste gas bypass line and partially through the evaporator. A control/regulating device, which cooperates with the valve device and the expansion machine, is further provided for controlling the valve device and the expansion machine, and for being able to adjust between the evaporator position and the bypass position or between the active and the inactive state, respectively, in this way.

According to the method according to the invention, the control/regulating device adjusts the valve device between the evaporator position and the bypass position as a function of a current operating state of the internal combustion engine. The control/regulating device furthermore calculates a power and/or energy, which can be currently generated by the waste heat utilization device as a function of the at least one operating parameter of the internal combustion engine. The control/regulating device switches the expansion machine between the active state and the inactive state as a function of this calculated power or energy, respectively.

According to a preferred embodiment, the control/regulating device adjusts the waste heat utilization device into a first state, when the internal combustion engine is turned off. In the first state, the valve device is in the bypass position and the expansion machine is in the inactive state. It is ensured in this way that the expansion machine and the valve device are in a defined state, when the internal combustion engine is turned off.

According to a preferred embodiment, the control/regulating device adjusts the waste heat utilization device from the first into a second state, when the internal combustion engine is turned on. In the second state, the control/regulating device thereby adjusts the valve device away from the bypass position of the first state, the expansion machine, however, remains in the inactive state. When the internal combustion engine is turned on, the evaporator is thus at least heated up, even if the expansion machine is not yet activated in this state and can thus not generate any mechanical work yet.

Particularly preferably, the control/regulating device transfers the waste heat utilization device from the second into a third state, in that the expansion machine is switched from the inactive state into the active stat, wherein the transfer or the switch, respectively, takes place as a function of the calculated power or energy, respectively, which the waste heat utilization device can generate when the expansion machine is activated.

According to a further preferred embodiment, the control/regulating device adjusts the valve device towards the evaporator position, when a nominal power, which is to be generated by the waste heat utilization device, increases. In the case of this embodiment, the control/regulating device adjusts the valve device towards the bypass position, when a nominal power, which is to be generated by the waste heat utilization device, decreases.

According to a further preferred embodiment, the control/regulating device transfers the waste heat utilization device from the second into a third state, in that the expansion machine is switched from the inactive state into the active state. The transfer or the switch, respectively, thereby takes place as a function of the calculated power or energy, respectively, which can currently be generated by the waste heat utilization device when the expansion machine is turned on.

According to a further preferred embodiment, the control/regulating device adjusts the valve device between the evaporator position and the bypass position as a function of the calculated power or energy, respectively, in the second and in the third state of the waste heat utilization device.

The control/regulating device preferably switches the waste heat utilization device between the second and the third state as a function of the calculated power or energy, respectively. This means that the control/regulating device switches the expansion machine back and forth between the active and the inactive state as a function of the calculated power or energy, respectively.

The adjusting between the second and the third state preferably takes place by means of the control/regulating device, thus the switch of the expansion machine, also as a function of at least one characteristic value of the waste heat utilization device.

This at least one characteristic value can advantageously be a temperature of the working fluid, which is measured at the input and/or at the output of the evaporator. It can be ensured in this way that the expansion machine is only activated when the temperature and thus the pressure of the working fluid has reached or exceeded, respectively, a threshold value required for the operation of the expansion machine.

According to a further preferred embodiment, the control/regulating device switches the waste heat utilization device into the first state, when the internal combustion engine is turned off by the user. It is ensured in this way that the waste heat utilization device is in a well-defined, safe operating state after the turn-off of the internal combustion engine.

According to another preferred embodiment, the control/regulating device adjusts the waste heat utilization device from the second or third state into the first state, when the control/regulating device detects or detected the presence of an error state in the waste heat utilization device. It can be ruled out in this way that the waste heat utilization device, in particular the expansion machine as well as the evaporator, are damaged or even destroyed based on said error state.

The invention also relates to an internal combustion engine for a motor vehicle. The internal combustion engine comprises a waste heat utilization device comprising a waste heat utilization cycle, in which a working fluid circulates and in which an evaporator for evaporating the working fluid is arranged. An expansion machine is arranged in the waste heat utilization cycle downstream from the evaporator, which expansion machine can be switched between an active state, in which it performs mechanical work by relaxing the working fluid, and an inactive state, in which the expansion machine does not perform any mechanical work. The evaporator has a waste gas line for guiding waste gas out of an internal combustion engine, through which, during the operation of the internal combustion engine, waste gas generated by said internal combustion engine is guided to the working fluid fluidically separately. To absorb heat from the waste gas, the working fluid in the evaporator thereby thermally interacts therewith. The waste heat utilization device of the internal combustion engine comprises a waste gas bypass line, via which the waste gas can be guided out of the internal combustion engine past the evaporator, thermally separately from the waste heat utilization cycle. A valve device is further provided, which can be adjusted between an evaporator position, in which the waste gas is guided, preferably completely, through the evaporator and past the waste gas bypass line, and a bypass position, in which the waste gas is guided, preferably completely, through the waste gas bypass line past the evaporator. The internal combustion engine or the waste gas utilization device, respectively, further comprises a control/regulating device, which cooperates with the valve device and the expansion machine, and which is set up/programmed to carry out the above-introduced method. The above-described advantages of the method can thus also be transferred to the internal combustion engine according to the invention.

According to a preferred embodiment, the control/regulating device performs the above-described method at least during the operation of the internal combustion engine.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
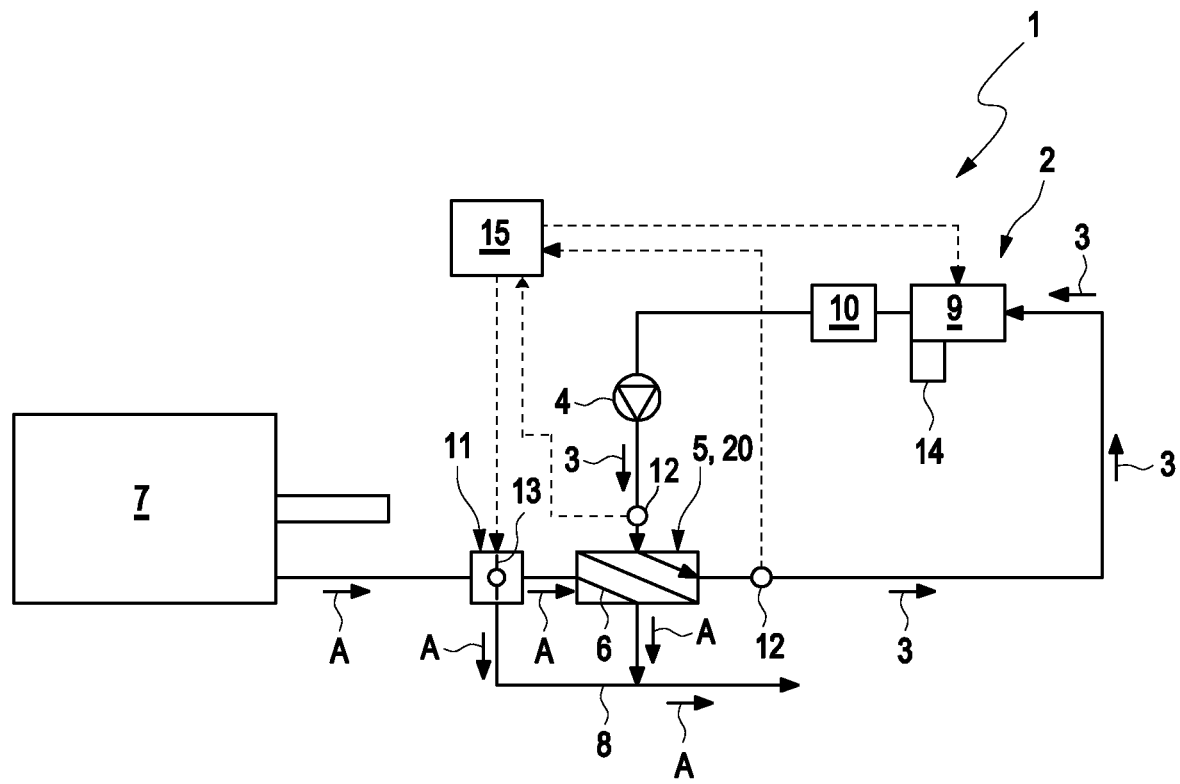
FIG. 1 shows an illustration, which illustrates the schematic setup of an internal combustion engine according to the invention comprising waste heat utilization device.

FIG. 1 illustrates an example of an internal combustion engine 7 according to the invention comprising a waste heat utilization device 1. The internal combustion engine 7 comprises a waste heat utilization cycle 2, in which a working fluid 3 circulates. A conveying device 4 for driving the working fluid 3 is arranged in the waste heat utilization cycle 2. An evaporator 5 for evaporating the working fluid 3 is arranged in the waste heat utilization cycle 2 downstream from the conveying device 4. The evaporator 5 is embodied as waste heat exchanger 20, by means of which the waste gas A from the internal combustion engine 7, which is guided through a waste gas line 6 of the waste heat utilization device 1, can be thermally coupled to the working fluid 3 for heat transfer.

In the evaporator 5 or waste gas heat exchanger 20, respectively, the waste gas line 6 runs fluidically separately form the waste heat utilization cycle 2, and is thermally coupled to the waste heat utilization cycle 2 for evaporating the working fluid 3. This allows for the transfer of heat from the waste gas A to the working medium 3 of the waste heat utilization cycle 2.

The waste heat utilization device 1 furthermore comprises a waste gas bypass line 8, via which the waste gas A from the internal combustion engine 7 can be guided past the evaporator 5, so that no thermal coupling with the working fluid 3 takes place.

An expansion machine 9 is arranged in the waste heat utilization cycle 2 downstream from the evaporator 5. Said expansion machine can be switched between an active state, in which it performs mechanical work by relaxing the working fluid 3, and an inactive state, in which no mechanical work is performed by the expansion machine 9. In the example scenario, the waste heat utilization device 1 has an electrical generator 14, to which the expansion machine 9 is drive-connected. The electrical energy recovered from the waste heat utilization device 1 in this way is available for a variety of uses. It can in particular be coupled into the drive train of the internal combustion engine 7 (not shown in the figures) by means of an electrical machine, which acts as electrical motor.

A condenser 10 for condensing the working fluid 3 is arranged in the waste heat utilization cycle 2 downstream from the expansion machine 9. The already mentioned conveying device 4 follows the condenser downstream from the condenser 10, so that the waste heat utilization cycle 2 is closed.

According to FIG. 1, the waste heat utilization device 1 comprises a valve device 11 comprising an adjustable valve body 13, which can be adjusted between an evaporator position, in which the waste gas A is guided through the evaporator 5 and not through the waste gas bypass line 8, and a bypass position, in which the waste gas A is guided through the waste gas bypass line 8 and thus past the evaporator 5. It goes without saying that the valve device 11 can on principle be adjusted into an infinite number of intermediate positions between the bypass position and the evaporator position, in which a portion of the waste gas A is guided through the waste gas bypass line 8 and a complementary portion of the waste gas is guided through the evaporator 5.

A control/regulating device 15 is further provided, which cooperates with the valve device 11 and with the expansion machine 9. This means that the control/regulating device 15 controls the valve device 11 for adjusting between the bypass position and the evaporator position, and can control the expansion machine 9 for adjusting between the active and the inactive state.

The method according to the invention will be described below by means of the state diagram of FIG. 2. In the course of the performance of the method according to the invention, the control/regulating device 15 adjusts the valve device 11 between the evaporator position and the bypass position as a function of one or a plurality of operating parameters of the internal combustion engine 7. For example the current speed of the internal combustion engine 7, the engine load currently acting on the internal combustion engine 7, the state of a cooling system for the engine cooling, as well as the charging status of a rechargeable battery, which can serve as electrical energy storage for driving an electrical machine, which cooperates with the internal combustion engine 7, are some of these operating parameters.

According to the method, the control/regulating device 15 calculates the power and/or energy, which can be currently generated by the waste heat utilization device 1, as a function of these operating parameters. The control/regulating device 15 thereby switches the expansion machine 9 between the active state and the inactive state as a function of this calculated power or energy, respectively.

When the internal combustion engine 7 is deactivated, thus turned off, an operation of the waste heat utilization device 1 is also not required. When the internal combustion engine 7 is turned off, the control/regulating device 15 thus adjusts the waste heat utilization device into a first state Z1, in which the valve device 11 is in the bypass position and the expansion machine 5 is in the inactive state. This state of the waste heat utilization device 1 is identified as "safe operating state".

Figure 2:
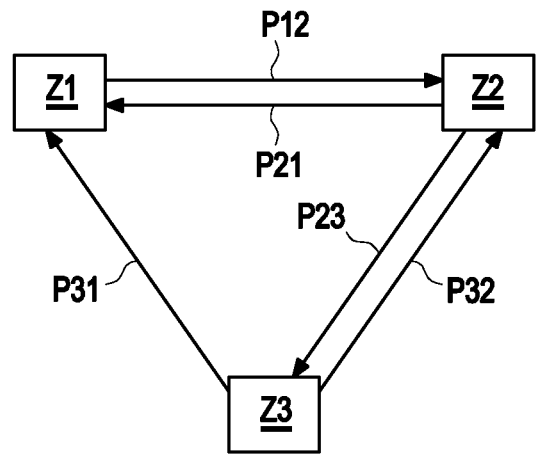
FIG. 2 shows an illustration, which illustrates the mode of operation of the method according to the invention.

If the internal combustion engine 7 is turned on—typically by the driver of a motor vehicle, into which the internal combustion engine 7 is installed as drive system—the control/regulating device 15 transfers the waste heat utilization device 1 from the first state Z1 into a second state Z2 (see arrow P12 in FIG. 2). For this purpose, the control/regulating device 15 adjusts the valve device 11 away from the bypass position, whereas the expansion machine 5 remains in the inactive state. In the extreme case, the valve device 11 is adjusted directly into the evaporator position, in which no waste gas can flow through the waste gas bypass line 8. An adjustment into an intermediate position between evaporator position and bypass position, however, is also possible. The waste heat utilization device 1 is supplied with heat from the waste gas A, which is ejected from the internal combustion engine 7, in this way, and the evaporator is heated up.

In the second state Z2 of the waste heat utilization device 1, the control/regulating device 15 adjusts between the bypass position and the evaporator position as a function of the already-mentioned operating parameters. The control/regulating device 15 thereby adjusts the valve device 11 towards the evaporator position, when a nominal power, which is to be generated by the waste heat utilization device 1, increases. The thermal energy introduced into the evaporator is increased in this way. The control/regulating device 15 accordingly adjusts the valve device 11 towards the bypass position, when the nominal power, which is to be generated by the waste heat utilization device 1, decreases. If the waste heat utilization device 1 is in the second state Z2 and if the internal combustion engine 7 is turned off, the waste heat utilization device 1 is transferred from the second state Z2 back into the first state Z1 again (see arrow P21 in FIG. 1).

The control/regulating device 15 transfers the waste heat utilization device 1 from the second state Z2 into a third state Z3 (see arrow P23 in FIG. 2), in that the expansion machine 9 is switched from the inactive state into the active state, and vice versa (see arrow 32). The transfer or the switch, respectively, from the second state Z2 into the third state Z3 and vice versa in particular takes place as a function of the calculated power or energy, respectively, which can currently be generated by the waste heat utilization device 1. In the third state Z3 of the waste heat utilization device 1, the control/regulating device 15 adjusts the valve device 11 analogously to the second state Z2.

The switch of the waste heat utilization device 1 between the second state Z2 and the third state Z3 by means of the control/regulating device 15, thus the switch of the expansion machine 9 between the active state and the inactive state, can also take place as a function of one or a plurality of characteristic values of the waste heat utilization device 1. Said characteristic value can be, for example, the temperature T of the working fluid 3 measured at the input of the evaporator 5, as well as, alternatively or additionally, also at the output of the evaporator 5.

A temperature sensor 12, which is arranged at the output of the evaporator 5 in the waste heat utilization cycle 2, is suggested in an exemplary manner in FIG. 1. Such a temperature sensor 12 can also be provided at the input of the evaporator in the waste heat utilization cycle 2.

If the control/regulating device 15 detects the presence of an error state in the waste heat utilization device 1, the control/regulating device 15 also transfers the waste heat utilization device 1 from the second or third state into the first state (see arrows 31 or P21, respectively).

The invention claimed is:

1. A method for operating an internal combustion engine including a waste heat utilization device comprising a waste heat utilization cycle in which a working fluid circulates, an evaporator for evaporating the working fluid arranged in the waste heat utilization cycle, and an expander arranged in the waste heat utilization cycle downstream from the evaporator, the expander switchable between an active state, in which the expander performs mechanical work via relaxing the working fluid, and an inactive state, in which the expander does not perform any mechanical work, the evaporator having a waste gas line for guiding waste gas out of the internal combustion engine and through which, during operation of the internal combustion engine, waste gas from the internal combustion engine is guided fluidically separately from the working fluid of the waste heat utilization cycle, the evaporator configured such that the working fluid in the evaporator thermally interacts with the waste gas for absorbing heat from the waste gas, the waste heat utilization device including a waste gas bypass line via which the waste gas is guidable past the evaporator, a valve mechanism adjustable between an evaporator position, in which the waste gas is guided through the evaporator and past the waste gas bypass line, and a bypass position, in which the waste gas is guided through the waste gas bypass line and past the evaporator, and a control/regulating device cooperating with the valve mechanism and the expander, the method comprising:

adjusting the valve mechanism between the evaporator position and the bypass position via the control/regulating device as a function of at least one operating parameter of the internal combustion engine;

calculating at least one of a power and an energy generatable by the waste heat utilization device via the control/regulating device as a function of the at least one operating parameter of the internal combustion engine;

switching the expander between the active state and the inactive state via the control/regulating device as a function of the at least one of the calculated power and the calculated energy; and transferring the waste heat utilization device into a first state, in which the valve mechanism is in the bypass position and the expander is in the inactive state, via the control/regulating device when the internal combustion engine is turned off.

2. The method according to claim 1, further comprising transferring the waste heat utilization device from the first state into a second state via the control/regulating device, when the internal combustion engine is turned on, wherein in the second state the valve mechanism is away from the bypass position and the expander is in the inactive state.

3. The method according to claim 2, further comprising:

adjusting the valve mechanism towards the evaporator position via the control/regulating device when the waste heat utilization device is in the second state and at least one of a nominal power and a nominal energy, which is to be generated by the waste heat utilization device, increases; and adjusting the valve mechanism towards the bypass position via the control/regulating device when the waste heat utilization device is in the second state and at least one of the nominal power and the nominal energy, which is to be generated by the waste heat utilization device, decreases.

4. The method according to claim 3, further comprising transferring the waste heat utilization device from the second state into a third state, in which the valve mechanism is away from the bypass position and the expander is in the active state, via the control/regulating device as a function of the at least one of the calculated power and the calculated energy.

5. The method according to claim 4, further comprising adjusting the valve mechanism between the evaporator position and the bypass position via the control/regulating device as a function of the at least one of the calculated power and the calculated energy in the second state of the waste heat utilization device and in the third state of the waste heat utilization device.

6. The method according to claim 4, wherein the waste heat utilization device is transferred from the second state to the third state also as a function of at least one characteristic value of the waste heat utilization device.

7. The method according to claim 6, wherein the at least one characteristic value is a temperature of the working fluid at at least one of an input and an output of the evaporator.

8. The method according to claim 1, wherein the waste heat utilization device is transferred into the first state when the internal combustion engine is turned off by a user.

9. The method according to claim 4, further comprising adjusting the waste heat utilization device from at least one of the second state and the third state into the first state via the control/regulating device when the presence of an error state is or was detected in the waste heat utilization device.

10. The method according to claim 1, wherein the at least one operating parameter of the internal combustion engine is at least one of:
   a speed of the internal combustion engine;
   a load acting on the internal combustion engine;
   a state of a cooling system for cooling the internal combustion engine; and
   a charging status of a rechargeable battery.

11. The method according to claim 2, wherein in the second state of the waste heat utilization device the valve mechanism is in an intermediate position between the bypass position and the evaporator position.

12. The method according to claim 2, wherein in the second state of the waste heat utilization device the valve mechanism is in the evaporator position.

13. The method according to claim 4, further comprising:
   adjusting the valve mechanism towards the evaporator position via the control/regulating device when the waste heat utilization device is in the third state and at least one of a nominal power and a nominal energy, which is to be generated by the waste heat utilization device, increases; and
   adjusting the valve mechanism towards the bypass position via the control/regulating device when the waste heat utilization device is in the third state and at least one of the nominal power and the nominal energy, which is to be generated by the waste heat utilization device, decreases.

14. The method according to claim 1, wherein the at least one operating parameter of the internal combustion engine is a charging status of a rechargeable battery.

15. An internal combustion engine for a motor vehicle, comprising:
   a waste heat utilization device including a waste heat utilization cycle in which a working fluid is circulatable;
   an evaporator for evaporating the working fluid arranged in the waste heat utilization cycle;
   an expander arranged in the waste heat utilization cycle downstream from the evaporator, the expander switchable between an active state, in which the expander does not perform any mechanical work via relaxing the working fluid, and an inactive state, in which the expander does not perform any mechanical work;
   the evaporator having a waste gas line for guiding waste gas out of an internal combustion engine and through which waste gas from the internal combustion engine during operation is guidable fluidically separately from the working fluid of the waste heat utilization cycle, the evaporator configured such that the working fluid in the evaporator thermally interacts with the waste gas for absorbing heat from the waste gas;
   the waste heat utilization device further including a waste gas bypass line via which the waste gas is guidable out of the internal combustion engine and one of (i) through the evaporator and (ii) past the evaporator, fluidically separately from the waste heat utilization cycle;
   the waste heat utilization device further including a valve mechanism adjustable between an evaporator position, in which the waste gas is guided through the evaporator and past the waste gas bypass line, and a bypass position, in which the waste gas is guided through the waste gas bypass line past the evaporator;
   a control/regulating device cooperating with the valve mechanism and the expander, the control/regulating device configured to (i) adjust the valve mechanism between the evaporator position and the bypass position as a function of at least one operating parameter of the internal combustion engine, (ii) calculate at least one of a power and an energy generatable by the waste heat utilization device as a function of the at least one operating parameter of the internal combustion engine, and (iii) switch the expander between the active state and the inactive state as a function of the at least one of the calculated power and the calculated energy; and
   wherein the control/regulating device is configured to, when the internal combustion engine is turned off, transfer the waste heat utilization device into a first state where the valve mechanism is in the bypass position and the expander is in the inactive state.

16. The internal combustion engine according to claim 15, wherein, at least during operation of the internal combustion engine, the control/regulating device (i) adjusts the valve mechanism between the evaporator position and the bypass position as a function of the at least one operating parameter of the internal combustion engine, (ii) calculates the at least one of the power and the energy generatable by the waste heat utilization device as a function of the at least one operating parameter of the internal combustion engine, and (iii) switches the expander between the active state and the inactive state as a function of the at least one of the calculated power and the calculated energy.

17. The internal combustion engine according to claim 15, further comprising:
   a condenser arranged in the waste heat utilization cycle downstream of the expander;
   a conveyor configured to drive the working fluid, the conveyor arranged in the waste heat utilization cycle downstream of the condenser;
   an electrical generator drivingly connected to the expander;
   an input temperature sensor arranged at an input of the evaporator in the waste heat utilization cycle; and
   an output temperature sensor arranged at an output of the evaporator in the waste heat utilization cycle.

18. The internal combustion engine according to claim 15, wherein the control/regulating device is configured to, when the internal combustion engine is turned on, transfer the waste heat utilization device from the first state into a second state where the valve mechanism is away from the bypass position and the expander is in the inactive state.

19. The internal combustion engine according to claim 18, wherein the control/regulating device is configured to transfer the waste heat utilization device from the second state into a third state where the valve mechanism is away from the bypass position and the expander is in the active state as a function of the at least one of the calculated power and the calculated energy.

20. The internal combustion engine according to claim 19, wherein the control/regulating device is configured to, when the waste heat utilization device is in at least one of the second state and the third state, adjust the valve mechanism between the evaporator position and the bypass position as a function of the at least one of the calculated power and the calculated energy.

\* \* \* \* \*